US 6,689,260 B1

United States Patent
Ahluwalia et al.

(10) Patent No.: US 6,689,260 B1
(45) Date of Patent: Feb. 10, 2004

(54) NUCLEAR FUEL ELECTROREFINER

(75) Inventors: Rajesh K. Ahluwalia, Burr Ridge, IL (US); Thanh Q. Hua, Bolingbrook, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/940,421

(22) Filed: Aug. 29, 2001

(51) Int. Cl.[7] .............................. C25C 7/00; G21C 19/44
(52) U.S. Cl. ................. 204/247.2; 204/238; 204/243.1; 204/295
(58) Field of Search ................... 205/43–49; 204/243.1, 204/247.2, 295, 238

(56) References Cited

U.S. PATENT DOCUMENTS

| | | | |
|---|---|---|---|
| 3,932,225 A | * 1/1976 | Bilal et al. | 205/44 |
| 4,880,506 A | * 11/1989 | Ackerman et al. | 205/44 |
| 5,171,409 A | * 12/1992 | Barnier et al. | 204/516 |
| 5,454,914 A | * 10/1995 | Gay | 205/44 |
| 5,458,745 A | * 10/1995 | Hradil | 205/589 |

FOREIGN PATENT DOCUMENTS

| | | | | |
|---|---|---|---|---|
| JP | 03073896 A | * | 3/1991 | G21C/19/44 |
| JP | 03073899 A | * | 3/1991 | G21C/19/44 |

* cited by examiner

Primary Examiner—Nam Nguyen
Assistant Examiner—Brian L Mutschler
(74) Attorney, Agent, or Firm—Bradley W. Smith; Mark P. Dvorscak; Paul A. Gottlieb

(57) ABSTRACT

The present invention relates to a nuclear fuel electrorefiner having a vessel containing a molten electrolyte pool floating on top of a cadmium pool. An anodic fuel dissolution basket and a high-efficiency cathode are suspended in the molten electrolyte pool. A shroud surrounds the fuel dissolution basket and the shroud is positioned so as to separate the electrolyte pool into an isolated electrolyte pool within the shroud and a bulk electrolyte pool outside the shroud. In operation, unwanted noble-metal fission products migrate downward into the cadmium pool and form precipitates where they are removed by a filter and separator assembly. Uranium values are transported by the cadmium pool from the isolated electrolyte pool to the bulk electrolyte pool, and then pass to the high-efficiency cathode where they are electrolytically deposited thereto.

16 Claims, 3 Drawing Sheets

Schematic Diagram of High Efficiency Cathode (HEC)

Schematic of direct transport and deposition modes of electrorefining

Schematic Diagram of High Efficiency Cathode (HEC)

US 6,689,260 B1

NUCLEAR FUEL ELECTROREFINER

CONTRACTUAL ORIGIN OF THE INVENTION

The United States Government has rights in this invention pursuant to Contract No. DE-AC02-98CH-10913 between the U.S. Department of Energy (DOE) and the University of Chicago representing Argonne National Laboratory.

FIELD OF THE INVENTION

The present invention relates generally to an apparatus for electrolytically refining nuclear fuel, and specifically to a nuclear fuel electrorefiner for recovering substantially purified uranium from nuclear fuels having a zirconium matrix and from nuclear fuels which do not have a zirconium matrix.

BACKGROUND ART

Spent nuclear fuel generally contains unused fissionable materials, including uranium. It is desirable to treat the spent nuclear fuel to remove the unused fissionable materials for ease if disposal as waste or for integration into newly manufactured nuclear fuels. Currently, spent metal fuel is electrolytically refined using an electrorefiner, which typically includes an anode in the form of a basket containing spent nuclear fuel, and a cathode for deposition of uranium, both submerged within a molten electrolyte pool. When a potential is placed across the anode and cathode, the nuclear fuel dissolves and uranium is electrolytically deposited on the cathode.

However, spent nuclear fuel also contains noble-metal and reactive fission products, actinides, and other metals such as zirconium which were present in the original fuel. When the spent nuclear fuel dissolves, if migration of the noble-metal fission products to the cathode is not prevented, then they will contaminate the uranium deposited on the cathode.

In general, where the nuclear fuel contains a zirconium matrix, the fate of the noble-metal fission products is tied to the dissolution of zirconium, such that the noble-metal fission products are retained with undissolved zirconium. Therefore, by limiting the dissolution of zirconium, the amount of noble-metal released into the electrolyte can be reduced, thus limiting the contamination of the uranium deposited at the cathode. Zirconium dissolution is controlled by limiting the current supplied to the fuel dissolution basket which, in turn, results in a longer amount of time necessary to dissolve the target uranium.

In addition, limiting the dissolution of zirconium also limits the dissolution of uranium, and therefore limits the amount of recoverable uranium. Further, where the spent fuel lacks a zirconium matrix (or other metal capable of retaining the noble-metal fission products), separation of the noble-metal fission products from the target unused fission materials (i.e. uranium) becomes impossible. Therefore, there is a present need for an apparatus and process capable of refining spent nuclear fuels which do not have a zirconium matrix.

Further, there is a need for an apparatus and process capable of refining spent nuclear fuels which contain a zirconium matrix, without the need for limiting the dissolution of zirconium while attempting to limit contamination at the cathode.

Therefore, it is a first object of the present invention to provide a process and apparatus capable of substantially separating noble-metal fission products from target unused fission materials, regardless of the matrix employed.

It is a second object of the present invention to provide a process and apparatus for refining nuclear fuel which provides both predictable and repeatable recovery of uranium.

It is a third object of the present invention to provide a process and apparatus having an enhanced throughput.

It is a further object of the present invention to provide a process and apparatus which requires fewer deposition steps.

Another object of the present invention is to provide an apparatus which can refine nuclear fuel in a shorter amount of time than conventional nuclear fuel electrorefiners.

SUMMARY OF THE INVENTION

The above-listed objects are met or exceeded by the present nuclear fuel electrorefiner for recovering substantially purified uranium from nuclear fuels having a zirconium matrix and from nuclear fuels which do not have a zirconium matrix. The electrorefiner includes a vessel having an anodic fuel dissolution basket and a high-efficiency cathode suspended therein. The high-efficiency cathode and fuel dissolution basket are suspended in a molten electrolyte pool, typically of mixed metal chlorides such as a eutectic salt of LiCl—KCl, the electrolyte floating on a cadmium pool.

An electrical-power supply in selective electrical communication with the fuel dissolution basket and high-efficiency cathode provides electrical power to the electrorefiner.

A shroud surrounds the fuel dissolution basket, and the shroud is positioned so as to separate the electrolyte pool into an isolated electrolyte pool within the shroud and a bulk electrolyte pool outside the shroud.

In operation, spent nuclear fuel is chopped into small segments which are placed within the fuel dissolution basket. Application of a potential across the fuel dissolution basket and high-efficiency cathode causes the nuclear fuel to dissolve. Unwanted noble-metal fission products and matrix material transfer to the electrolyte within the shroud and to the cadmium pool forming precipitates which are removed by a filter and separator assembly. Uranium values are transported by the cadmium pool from the isolated electrolyte pool to the bulk electrolyte pool, and then to the high-efficiency cathode where they are electrolytically deposited. The high-efficiency cathode includes a mandrel for collecting electrolytically deposited material and a collection basket below the mandrel substantially preventing electrolytically deposited material separated from the mandrel from dropping into the cadmium pool.

BRIEF DESCRIPTION OF THE DRAWINGS

Other objects and advantages of the invention will become apparent upon reading the following detailed description and upon reference to the drawings in which.

DESCRIPTION OF THE INVENTION

Figure 1:
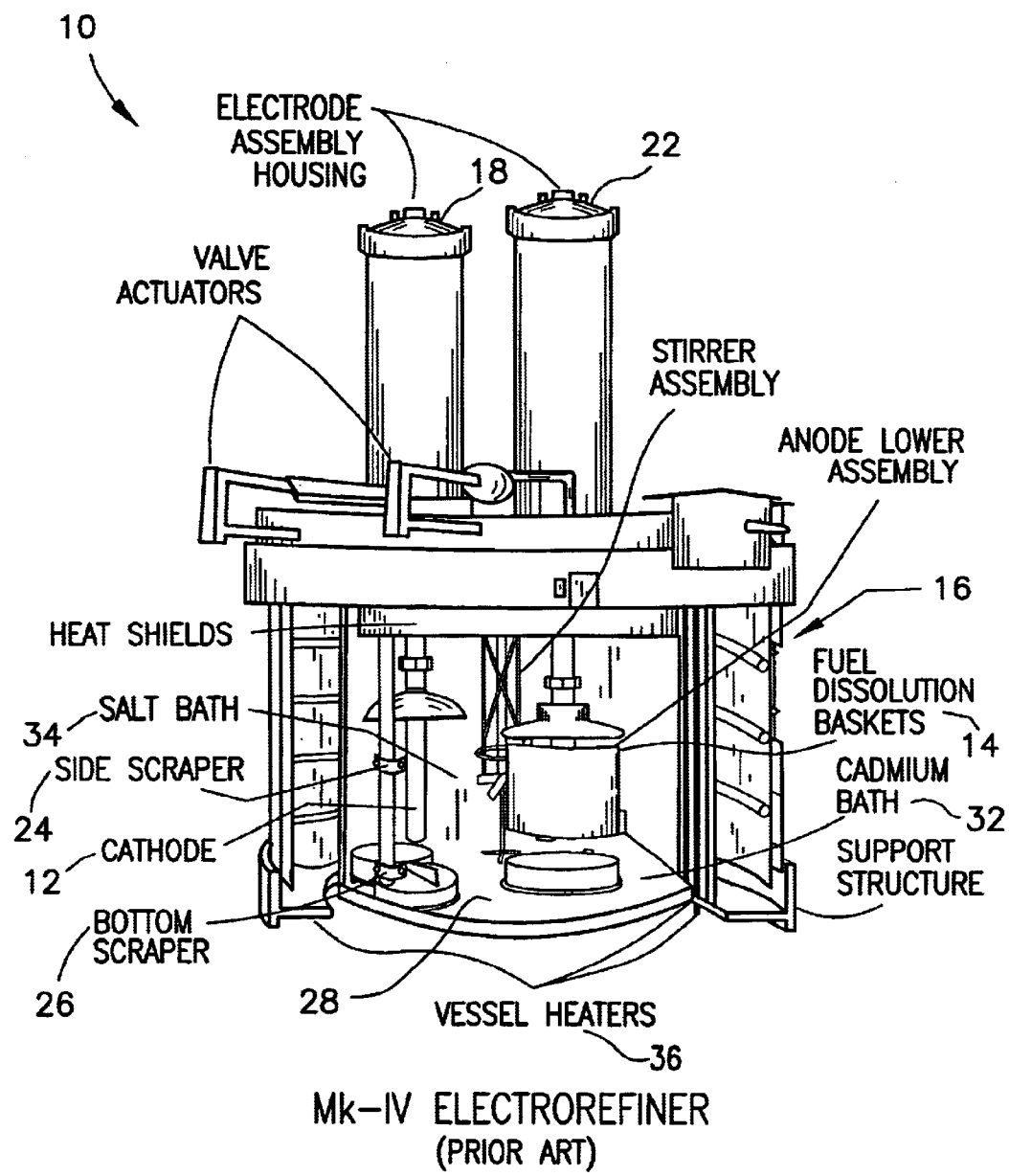
FIG. 1 is an break-away perspective view of a conventional nuclear fuel electrorefiner.

While this invention is susceptible of embodiment in many different forms, there is shown in the drawings and will herein be described in detail, one specific embodiment, with the understanding that the present disclosure is to be considered merely an exemplification of the principles of the invention and is not intended to limit the invention only to the embodiment illustrated.

FIG. 1 illustrates a conventional electrorefiner 10. A rotatable cathode 12 and an anodic rotatable fuel dissolution basket 14 are positioned within a vessel 16. Positioned above the vessel 16 is a cathode electrode assembly 18 and a fuel dissolution basket electrode assembly 22. Each electrode assembly 18, 22 includes a rotation assembly (not shown) in rotation transfer relationship with the cathode 12 and fuel dissolution basket 14, respectively.

Rotation of the cathode 12 and fuel dissolution basket 14 during the refining process ensures a uniform dissolution of nuclear fuel in the fuel dissolution basket 14 and a uniform electrolytic disposition of uranium at the cathode 12. The cathode 12 and fuel dissolution basket 14 are typically rotated at a speed of about 5 to about 20 rpm. However, it has been found that rotation of the fuel dissolution basket 14 and cathode 12 at speeds greater than 20 rpm while facilitating dissolution of the nuclear fuel also results in higher concentrations of noble-metal fission products within the electrolytically deposited uranium. Therefore, contamination of the electrolytically deposited uranium is a function of the rotation speeds of the fuel dissolution basket 14 and cathode 12. In addition, because a portion of the noble-metals also leave the dissolution basket 14 during the dissolution of zirconium, contamination of the electrolytically deposited uranium is also a function of the amount of zirconium dissolved during the electrorefining process.

The electrode assemblies 18, 22 are also the means by which electrical power is selectively supplied to the cathode 12 and fuel dissolution basket 14 from a power source (not shown) to initiate and sustain the electrolytic transport of uranium values from the anode 14 to the cathode 12.

One or more side scrapers 24 are mounted within the vessel 16 for limiting the diameter of electrolytically deposited uranium on the cathode 12 to ensure the cathode in combination with electrolytically deposited uranium can be removed from the vessel 16 upon completion of the refining process. Also provided is a bottom scraper 26 mounted within the vessel 16 for preventing the downward growth of electrolytically deposited uranium beyond the electrolyte pool 34.

The vessel 16 has a lower bottom portion 28 containing a molten cadmium pool 32. One function of the cadmium pool 32 is to catch and dissolve electrolytically deposited uranium separated from the cathode12. Floating on the top of the cadmium pool 32 is the electrolyte pool 34 which is composed of a molten eutectic salt of LiCl—KCl (typically 41 mol % KCl) containing about 2 mol % $UCl_3$. A plurality of vessel heaters 36 in heat transfer relationship with the vessel 16 maintain the electrolyte pool 34 and cadmium pool 32 at about 450° C. to about 500° C.

Figure 2:
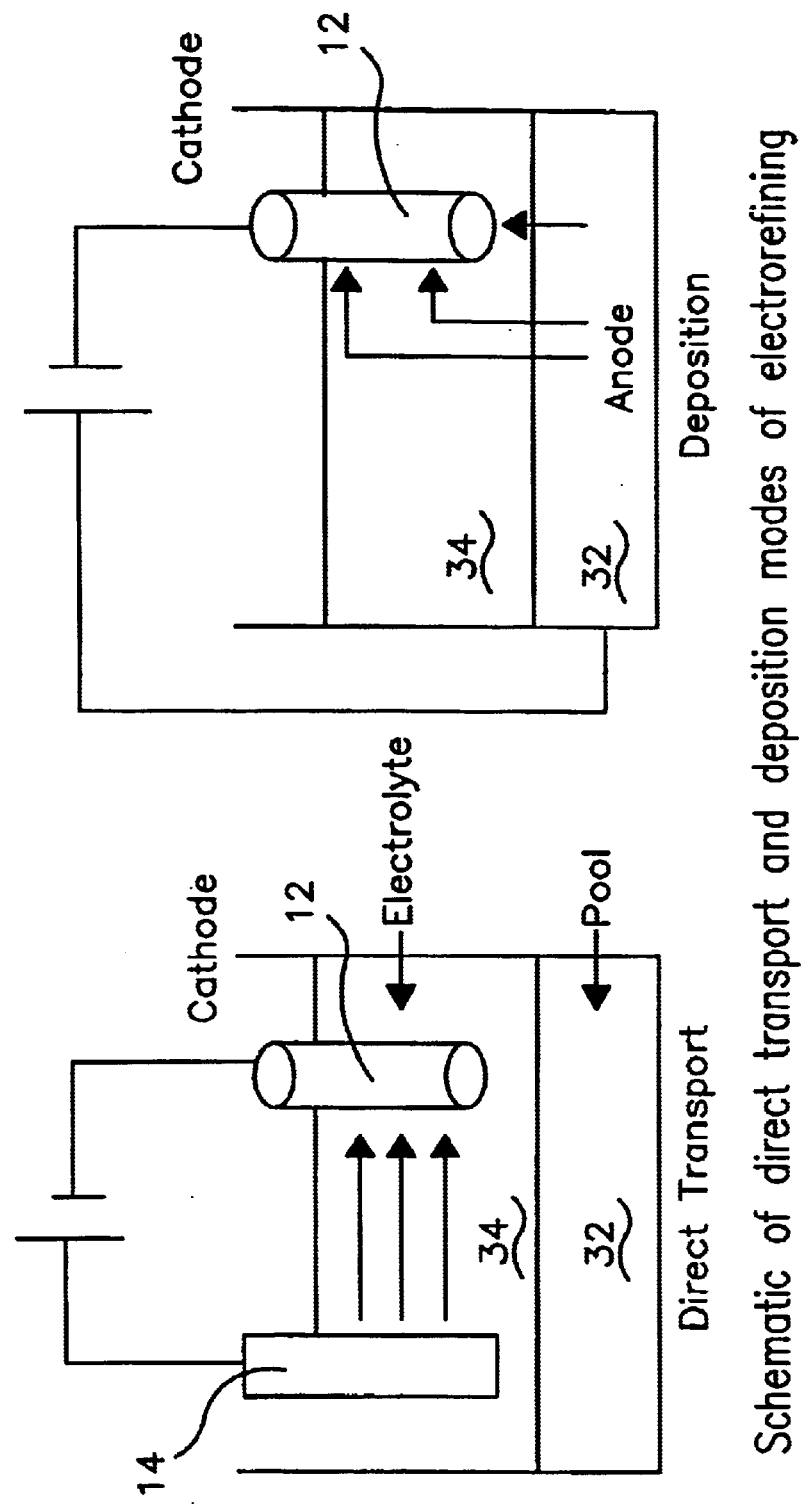
FIG. 2 is a schematic diagram of the direct transport step and the deposition step of a conventional electrorefiner.

In operation, nuclear fuel electrorefining using a conventional electrorefiner 10 is accomplished using at least two steps. Referring to FIG. 2, the first step is referred to as a direct transport. During the direct transport, a potential is placed across the anodic fuel dissolution basket 14 and the cathode 12. The nuclear fuel dissolves and uranium values migrate to the cathode 12 where they are reduced and thereby electrolytically deposited on the cathode 12. The second step is referred to as deposition. During deposition, a potential is placed across the cadmium pool 32 and the cathode 12, thereby causing the uranium rich cadmium pool 32 to act as the anode.

However, as noted above, contamination of the electrolytically deposited uranium is a function of the dissolution of zirconium, and the rotation speeds of the fuel dissolution basket 14 and cathode 12. Therefore, dissolution of the zirconium matrix must be limited. It has been found that zirconium loss typically results if more than 90% of the uranium is dissolved. Therefore, if substantially pure uranium is desired, a conventional nuclear fuel electrorefiner 10 can not be more than about 90% efficient.

Figure 3:
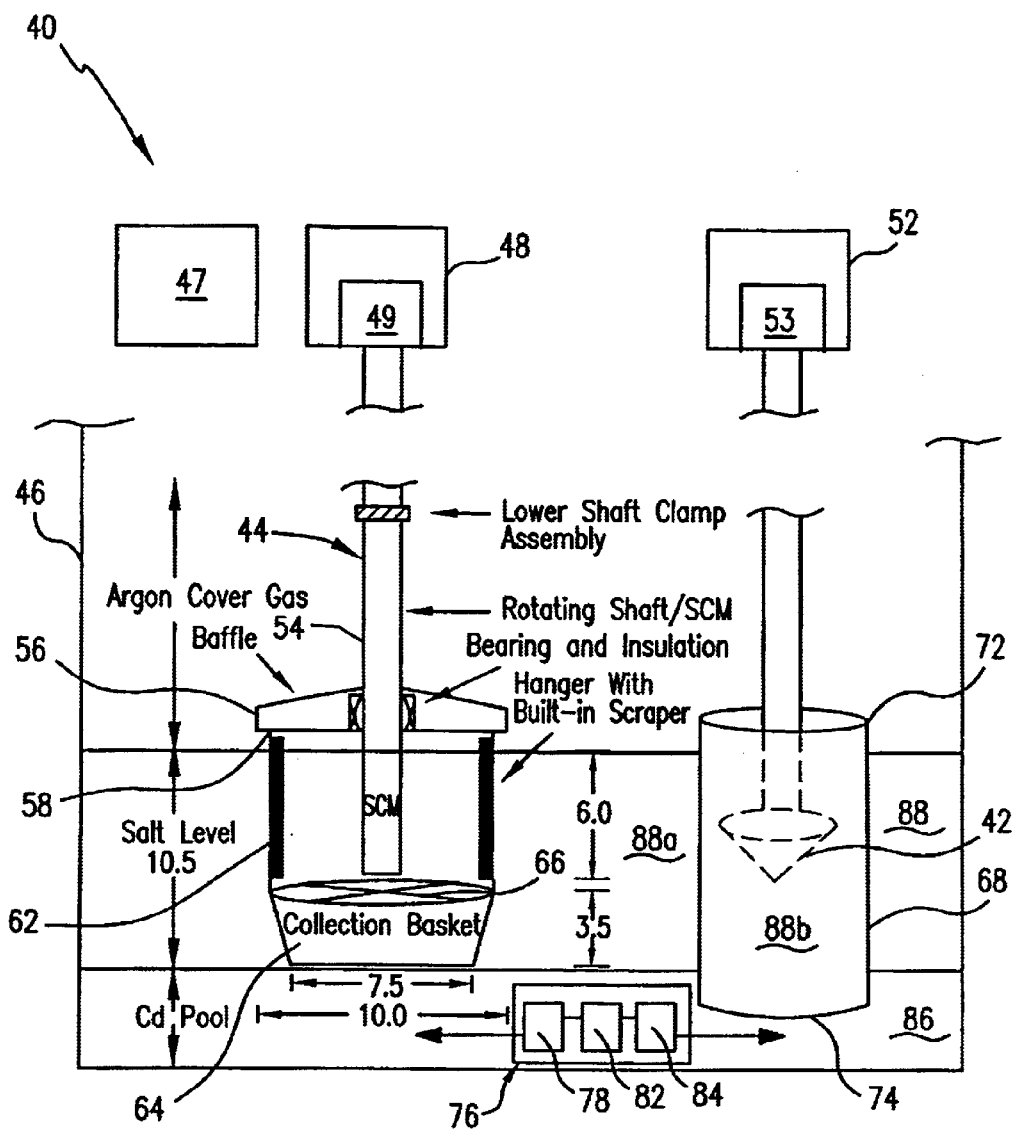
FIG. 3 is a schematic diagram of the nuclear fuel electrorefiner of the present invention.

As shown in FIG. 3 and as previously mentioned, the nuclear fuel electrorefiner 40 of the present invention includes a rotatable anodic fuel dissolution basket 42 and a high-efficiency cathode assembly 44, both suspended within a vessel 46. An electrical power supply 47 in selective electrical communication with the fuel dissolution basket 42 and the high-efficiency cathode assembly 44 is provided for selectively providing electrical power to nuclear fuel electrorefiner 40. Selective electrical communication allows the electrical current to be varied during the electrorefining process. It should be noted that the amount of electrical current supplied to the nuclear fuel electrorefiner 40, as well as the duration, will depend on the type and amount of nuclear fuel present in the fuel dissolution basket 42. Further, one with ordinary skill in the art would readily be able to determine the requisite electrical current necessary to dissolve the particular nuclear fuel and be able to determine for how long the current would need to be applied to dissolve the particular nuclear fuel.

Positioned above the vessel 46 is a high-efficiency cathode electrode assembly 48 and a fuel dissolution basket electrode assembly 52. Each electrode assembly 48, 52 includes a rotation assembly 49, 53 in rotation transfer relationship with the high-efficiency cathode assembly 44 and fuel dissolution basket 42, respectively. In addition, the electrode assemblies 48, 52 provide the means through which electrical power is selectively applied to the fuel dissolution basket 42 and the high-efficiency cathode assembly 44.

The high-efficiency cathode assembly 44 includes a rotatable cathodic solid mandrel 54 on which material is electrolytically deposited. The mandrel 54 extends through a non-rotating baffle 56. One or more hangers 58 extend downwardly from the baffle 56, and are fixedly connected thereto. Each hanger 58 includes one or more side scrapers 62 for limiting the diameter of material electrolytically deposited on the mandrel 54.

A non-rotating collection basket 64 fixedly attached to the one or more hangers 58 is positioned below the mandrel 54. The collection basket 64 collects electrolytically deposited material separated from the mandrel 54 during the electrorefining process. By collecting electrolytically deposited material separated from the mandrel 54 in the collection basket 64 rather than allowing the separated material to drop into the cadmium pool 86, deposition of uranium from the cadmium pool 86 is unnecessary.

Extending across the top of the collection basket 64 is a bottom scraper 66 for substantially preventing downward growth of electrolytically deposited material beyond the bottom scraper 66. In the preferred embodiment, the bottom scraper includes a plurality of cris-crossing wires. When the mandrel 54 rotates, the wires contact and cut through the electrolytically deposited material, thereby separating from the mandrel 54 substantially all electrolytically deposited material extending downwardly beyond the wires. The separated portion of the electrolytically deposited material then drops into the collection basket 64 for collection after the electrorefining process is complete.

A shroud 68 having a top end 72 and an open-ended bottom end 74 is provided. The shroud 68 surrounds the fuel dissolution basket 42 to prevent unwanted materials (i.e. the matrix, noble-metal fission products) from contaminating material electrolytically deposited on the mandrel 54. In the preferred embodiment, the shroud 68 is ceramic, preferably beryllium oxide.

An in-situ filter and separator assembly 76 positioned within the vessel 46 collects precipitates formed during the electrorefining process. The filter and pump assembly 76 includes a pump 78 for drawing the precipitates into the assembly 76, a coarse filter 82 for straining precipitates formed upon dissolution of the nuclear fuel matrix, and a separator 84 for capturing the finer precipitates formed upon dissolution of the noble-metal fission products. It is contemplated that the pump 78, coarse filter 82 and separator 84 can be combined in any conventional way, and one with ordinary skill in the art would readily be able to combine the pump 78, coarse filter 82 and separator 84.

In the preferred embodiment, the coarse filter 82 is an approximately 10 to approximately 35-micron stainless steel mesh, preferably 10-micron. However, the pore size of the coarse filter 82 will often depend upon the composition of the nuclear fuel, and the requisite pore size could readily be determined by one with ordinary skill in the art.

In addition, in the preferred embodiment, the separator 84 is a centrifuge. An alternate embodiment is contemplated wherein a fine filter is used to collect the finer precipitates (meaning all those precipitates capable of passing through the coarse filter 82 selected). However, use of a centrifuge to remove the finer precipitates is preferred over use of a finer filter so as to avoid generating a secondary waste stream.

To operate the nuclear fuel electrorefiner 40, a molten cadmium pool 86 is placed at the bottom portion of the vessel 46. Floating on the top of the cadmium pool 86 is an electrolyte pool 88 composed of a molten eutectic salt of LiCl—KCl (preferably about 41 mol % KCl) containing about 2 mol % UCl$_3$. A plurality of vessel heaters (not shown) in heat transfer relationship with the vessel 46 maintain the electrolyte pool 88 and cadmium pool 86 in their molten state, preferably about 450° C. to about 500° C.

To operate the nuclear fuel electrorefiner 40, the shroud 68 is positioned to extend upwardly out of the electrolyte pool 88 and is positioned to extend downwardly to contact at least the top of the cadmium pool 86, preferably into the cadmium pool 86. By thus positioning the shroud 68, the electrolyte pool 88 is separated into two isolated portions: a bulk electrolyte pool 88a (the portion of the electrolyte pool 88 located outside the shroud 68) and an isolated electrolyte pool 88b (the portion of the electrolyte pool 88 located within the shroud 68).

When nuclear fuel (whether spent or unused) is placed into the fuel dissolution basket 42, a threshold current sufficient to dissolve substantially all of the matrix, noble-metal fission products and uranium is placed across the fuel dissolution basket 42. The shroud 68 is positioned so as to prevent the unwanted matrix and noble-metals from migrating across the electrolyte pool 88 to the cathodic mandrel 54. In the preferred embodiment, the shroud 68 is positioned so that it extends upwardly out of the electrolyte pool 88, and extends downwardly partially into the cadmium pool 86, isolating the isolated electrolyte pool 88b from the remaining or bulk electrolyte pool 88a.

Because the shroud 68 retains the unwanted materials, and therefore there is no need to limit the current to retain the matrix, the current to the fuel dissolution basket 42 may be increased beyond the threshold current, thereby decreasing the time necessary to dissolve substantially all of the matrix, noble-metal fission products and uranium. In addition, the rotation speed of the fuel dissolution basket 42 and/or the high-efficiency cathode assembly 44 can exceed speeds utilized in conventional electrorefiners 10. Increasing the rotation speed of the fuel dissolution basket 42 increases electrolyte flow through the fuel dissolution basket 42, thereby decreasing the time necessary to dissolve substantially all of the matrix, noble-metal fission products and uranium.

The noble-metal fission products and matrix material in the isolated electrolyte pool 88b within the shroud 68 transfer to the cadmium pool 86 and form precipitates where they are drawn by the pump 78 into the filter and separator assembly 76, as indicated by the arrows in FIG. 3, and are thereby removed from the cadmium pool 86. Uranium values migrate through the cadmium pool 86 into the bulk electrolyte pool 88a and to the mandrel 54 where they are electrolytically deposited thereto.

Table 1 is a calculated example showing the advantages of the nuclear fuel electrorefiner 40 of the present invention as compared to a conventional nuclear fuel electrorefiner 10.

TABLE 1

|  | Conventional Nuclear Fuel Electrorefiner | Nuclear Fuel Electrorefiner of the Present Invention |
| --- | --- | --- |
| amp · hours (Ah) per U dissolved (Ah/kg) | 434.6 | >434.6 |
| ave. dissolution current at fuel dissolution basket (A) | 58.2 | >100 |
| ave. dissolution time (h/kg) | 7.5 | <4.4 |
| dissolution rate (g/h) | 134 | >230 |
| net collection current at cathode (A) | 26.9 | >100 |
| net collection rate at cathode (g/h) | 80 | >300 |

The foregoing description of an embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims as set forth below.

The embodiments of the invention in which an exclusive property or privilege is claimed are defined as follows:

1. A nuclear fuel electrorefiner for recovering uranium from nuclear fuel containing uranium, comprising:

a vessel;

an anodic fuel dissolution basket disposed within said vessel;

a continuous shroud surrounding said anodic fuel dissolution basket in the form of an open-ended sleeve and having a top edge and a bottom edge;

a cathode disposed within said vessel;

an electrical power supply in selective electrical communication with said cathode and with said anodic fuel dissolution basket to provide electrical power to said nuclear fuel electrorefiner as required;

a lower cadmium pool and an upper electrolyte layer are contained within said vessel so that said top edge of said shroud is positioned above an upper surface of the electrolyte layer and said bottom edge of said shroud contacts or penetrates an upper surface of the cadmium pool thereby separating the electrolyte into an isolated electrolyte within said shroud and a bulk electrolyte outside of said shroud and where said anodic fuel dissolution basket and said cathode are positioned in said electrolyte layer; and a filter assembly positioned within said vessel for collecting precipitates formed from noble-metal fission products and matrix material.

2. The nuclear fuel electrorefiner of claim 1, further comprising a separator assembly positioned within said vessel for collecting precipitates formed from noble-metal fission products and matrix material.

3. The nuclear fuel electrorefiner of claims 2, wherein said separator assembly is a centrifuge.

4. The nuclear fuel electrorefiner of claim 2, further comprising a pump positioned within said vessel for transporting cadmium with precipitates formed from noble-metal fission products and matrix material through said filter assembly and through said separator assembly.

5. A nuclear fuel electrorefiner for recovering uranium from nuclear fuel containing uranium, comprising:

a vessel;

a anodic fuel dissolution basket disposed within said vessel;

a fuel dissolution basket rotation assembly operably connected to said anodic fuel dissolution basket for rotating said anodic fuel dissolution basket;

a continuous shroud surrounding said anodic fuel dissolution basket in the form of an open-ended sleeve and having a top edge and a bottom edge;

a cathode disposed within said vessel;

a cathode rotation assembly operably connected to said cathode for rotating said cathode;

a collection basket positioned below said cathode for collecting electrolytically deposited material separated from said cathode;

a first scraper mounted on said collection basket for preventing downward growth of electrolytically deposited material beyond said first scraper;

an electrical power supply in selective electrical communication with said cathode and with said anodic fuel dissolution basket for providing electrical power to said nuclear fuel electrorefiner;

a lower cadmium pool and an upper electrolyte layer are contained within said vessel so that said top edge of said shroud is positioned above an upper surface of the electrolyte layer and the bottom edge of said shroud contacts or penetrates an upper surface of said cadmium pool effectively separating the electrolyte layer into two isolated portions an isolated electrolyte layer located inside the shroud and a bulk electrolyte layer located external to said shroud and where said anodic fuel dissolution basket and said cathode are positioned in said electrolyte layer; and a filter assembly positioned within said vessel for collecting precipitates formed from noble-metal fission products and matrix material.

6. The nuclear fuel electrorefiner of claim 5, further comprising a separator positioned within said vessel for collecting precipitates formed from noble-metal fission products and matrix material.

7. The nuclear fuel electrorefiner of claim 6, wherein said separator is a centrifuge.

8. The nuclear fuel electrorefiner of claim 6, further comprising a pump positioned within said vessel for transporting cadmium with precipitates formed from noble-metal fission products and matrix material through said filter assembly and through said separator.

9. A nuclear fuel electrorefiner for recovering uranium from nuclear fuel having a zirconium alloy cladding and containing uranium, noble-metals and fission products, comprising:

a vessel;

a anodic fuel dissolution basket contained within said vessel;

a continuous shroud surrounding said anodic fuel dissolution basket in the form of an open-ended sleeve and having a top edge and a bottom edge;

a cathode contained within said vessel;

a filter assembly disposed within said vessel for collecting precipitates;

a separator assembly disposed within said vessel for collecting precipitates;

an electrical power supply in selective electrical communication with said cathode and with said anodic fuel dissolution basket for providing electrical power to said nuclear fuel electrorefiner; and a lower cadmium pool and an upper electrolyte are contained within said vessel with said anodic fuel dissolution basket and said cathode in the electrolyte layer and with said filter and separator assembly in communication with the lower cadmium pool; in addition, said top edge of said shroud extends above an upper surface of said electrolyte layer and said bottom edge contacts or penetrates below an upper surface of said cadmium pool to form an isolated electrolyte layer interior to said shroud and a bulk electrolyte layer outside of said shroud.

10. The nuclear fuel electrorefiner of claim 9, wherein said shroud is ceramic.

11. The nuclear fuel electrorefiner of claim 9, further comprising a collection basket positioned below said cathode for collecting electrolytically deposited material separated from said cathode.

12. The nuclear fuel electrorefiner of claim 9, further comprising a scraper associated with said collection basket for preventing downward growth of electrolytically deposited material beyond said scraper.

13. The nuclear fuel electrorefiner of claim 12, wherein said scraper includes a plurality of wires.

14. The nuclear fuel electrorefiner of claim 9, further comprising a scraper associated with said vessel for limiting the diameter of material electrolytically deposited on said cathode.

15. The nuclear fuel electrorefiner of claim 9, wherein said separator assembly is a centrifuge.

16. The nuclear fuel electrorefiner of claim 9, further comprising a pump positioned within said vessel for transporting cadmium with precipitates formed from noble-metal fission products and matrix material through said filter assembly and through said separator assembly.

* * * * *